(12) United States Patent
Kitabayashi et al.

(10) Patent No.: US 7,222,976 B2
(45) Date of Patent: *May 29, 2007

(54) OPTICAL DEVICE AND PROJECTOR

(75) Inventors: Masashi Kitabayashi, Horigane-mura (JP); Kazuyuki Iinuma, Hotaka-machi (JP); Hiroshi Kobayashi, Shiojiri (JP); Hidetoshi Hashizume, Hotaka-machi (JP)

(73) Assignee: Seiko Epson Corporation, Tokyo (JP)

( * ) Notice: Subject to any disclaimer, the term of this patent is extended or adjusted under 35 U.S.C. 154(b) by 184 days.

This patent is subject to a terminal disclaimer.

(21) Appl. No.: 11/033,293

(22) Filed: Jan. 12, 2005

(65) Prior Publication Data

US 2005/0157276 A1    Jul. 21, 2005

(30) Foreign Application Priority Data

Jan. 15, 2004  (JP) ............................. 2004-008342

(51) Int. Cl.
*G03B 21/28* (2006.01)
*G03B 21/22* (2006.01)

(52) U.S. Cl. ........................................ 353/98; 353/119
(58) Field of Classification Search ................. 353/37, 353/72, 77, 85, 98, 119; 352/242
See application file for complete search history.

(56) References Cited

U.S. PATENT DOCUMENTS 4,657,316 A * 4/1987 Hardt et al. ................. 312/7.2
5,520,361 A * 5/1996 Lee ............................. 248/398
5,806,940 A * 9/1998 Heirich ........................ 312/7.2
2006/0050253 A1* 3/2006 Iinuma et al. ............... 353/119

FOREIGN PATENT DOCUMENTS

JP    A 2000-321661    11/2000
JP    A 2001-033873    2/2001

* cited by examiner

*Primary Examiner*—Melissa Jan Koval
(74) *Attorney, Agent, or Firm*—Oliff & Berridge, PLC

(57) ABSTRACT

An optical device is disposed with: a swollen portion that is attached to the underside of a reflective surface of a reflective mirror, swells in an outward direction of the reflective mirror and is configured as part of a spherical surface. A mirror orientation adjustment lever that is attached to the underside of the reflective surface of the reflective mirror, extends along the underside of the reflective mirror, and protrudes from an end edge of the reflective mirror when seen planarly. The reflective mirror is disposed along a side wall of an optical parts-use casing. The side wall includes, at the position where the reflective mirror is disposed, a spherical concave portion corresponding to a spherical surface of the swollen portion, and when the reflective mirror is disposed at the disposition position, the swollen portion is supported by the spherical concave portion.

16 Claims, 12 Drawing Sheets

OPTICAL DEVICE AND PROJECTOR

BACKGROUND

Exemplary aspects of the present invention relate to an optical device and a projector.

Related art, projectors are disposed with an optical device including: plural optical parts disposed on an optical path of light beams emitted from a light source; and an optical parts-use casing where an illumination optical axis of the light beams is set inside and which houses the plural optical parts and is disposed at a predetermined position.

Here, as the optical parts, plural optical elements that change the optical characteristics of the light beams emitted from the light source, and plural mirrors that reflect and/or transmit the light beams emitted from the light source and guide the light beams on a predetermined illumination optical axis, are used.

In such a projector, it is necessary to relatively position the optical elements serving as the optical parts and to prevent displacement of the inclination positions of the reflective surfaces of the mirrors in order to obtain a sharper projection image. Additionally, a retention structure that can adjust the orientations of the mirrors has been disclosed in JP-A-2000-321661.

In the mirror retention structure described in JP-A-2000-321661, center portions at lower ends of the mirrors are nipped by one protruding portion formed on the optical parts-use casing and a substantially U-shaped plate spring attached with a fixing screw to the optical parts-use casing. Also, two places at upper ends of the mirrors are nipped by two eccentric discs pivotably attached to the optical parts-use casing and a substantially U-shaped plate spring attached with a fixing screw to the optical parts-use casing. Additionally, by independently pivoting each eccentric disc using a tool, such as a driver, at least one of the inclination of the vertical direction of the mirrors and the inclination of the horizontal direction of the mirrors is adjustable.

SUMMARY

However, in the mirror retention structure described in JP-A-2000-321661, the two plate springs and the two eccentric discs are necessary in order to dispose the mirrors in the optical parts-use casing. Thus, there is the problem that the number of parts and the manufacturing cost increase.

Also, when disposing the mirrors in the optical parts-use casing, it is necessary to attach the two plate springs and the two eccentric discs to the optical parts-use casing. Moreover, it is necessary to pivot the two eccentric discs with a tool, such as a driver, in order to adjust the orientations of the mirrors. Thus, with respect to disposing and adjusting the orientations of the mirrors, there is the problem that a cumbersome burden is placed on the operator.

Exemplary aspects of the present invention provide an optical device and a projector with which the number of parts and the manufacturing cost can be reduced, and with which the disposition and adjustment of the orientation of a reflective mirror can be easily done.

An optical device of an exemplary aspect of the invention includes: plural optical parts including a reflective mirror disposed on an optical path of light beams emitted from a light source; an optical parts-use casing where an illumination optical axis of the light beams is set inside and which houses and retains the plural optical parts at a predetermined position with respect to the illumination optical axis; a swollen portion that is attached to an underside of a reflective surface of the reflective mirror, swells in an outward direction of the reflective mirror and is configured as part of a spherical surface; and a mirror orientation adjustment lever that is attached to the underside of the reflective surface of the reflective mirror, extends along the underside of the reflective mirror and planarly protrudes from an end edge of the reflective mirror. The reflective mirror is disposed along a side wall of the optical parts-use casing, and the side wall includes, at a position where the reflective mirror is disposed, a concavely curved surface corresponding to the spherical surface of the swollen portion. When the reflective mirror is disposed at the disposition position, the concavely curved surface supports the swollen portion.

Here, the swollen portion and the mirror orientation adjustment lever may be integrally formed or separately configured.

In an exemplary aspect of the present invention, the swollen portion and the mirror orientation adjustment lever are attached to the underside of the reflective surface of the reflective mirror, and the reflective mirror in this state is disposed at a predetermined disposition position in the side wall of the optical parts-use casing. The swollen portion is supported by the concavely curved surface of the optical parts-use casing. Thus, by disposing the swollen portion and the mirror orientation adjustment lever, the number of parts and the manufacturing cost can be reduced in comparison to a related art mirror retention structure.

Also, by attaching the swollen portion and the mirror orientation adjustment lever to the underside of the reflective surface of the reflective mirror, the labor to dispose the reflective mirror in the optical parts-use casing can be done easily.

Moreover, the swollen portion is configured as part of the spherical surface. The concavely curved surface has a shape corresponding to the spherical surface of the swollen portion, and the mirror orientation adjustment lever planarly protrudes from the end edge of the reflective mirror. Thus, by grabbing the mirror orientation adjustment lever with, for example, one's hand and moving the mirror orientation adjustment lever after the reflective mirror has been disposed at the predetermined disposition position in the optical parts-use casing, the swollen portion rotates and slides on the concavely curved surface around a hypothetical center of the spherical surface, so that the orientation of the reflective mirror can be easily and precisely adjusted.

Thus, the manufacturing cost can be reduced by reducing the number of parts. The disposition and adjustment of the orientation of the reflective mirror can be done easily without placing a cumbersome burden on the operator.

In an optical device of an exemplary aspect of the invention, the swollen portion and the mirror orientation adjustment lever may be an integrally molded product.

According to this exemplary aspect of the invention, the number of parts can be further reduced because the swollen portion and the mirror orientation adjustment lever are an integrally molded product. The labor to attach the swollen portion and the mirror orientation adjustment lever to the reflective mirror can be done easily. Specifically, the labor to dispose the reflective mirror can be done more easily.

In the optical device of an exemplary aspect of the invention, the mirror orientation adjustment lever may be formed a step lower with respect to an attachment surface of the swollen portion that attaches to the underside of the reflective mirror.

In an exemplary aspect of the invention, because the mirror orientation adjustment lever is formed a step lower with respect to the attachment surface of the swollen portion that attaches to the underside of the reflective mirror, a predetermined gap is formed between the mirror orientation adjustment lever and the underside of the reflective surface of the reflective mirror when the swollen portion and the mirror orientation adjustment lever are attached to the underside of the reflective surface of the reflective mirror. Thus, by pushing a tool, such as a driver, in this gap, for example, the swollen portion and the mirror orientation adjustment lever can be easily removed with respect to the reflective mirror, so that reworkability can be enhanced.

In the optical device of an exemplary aspect of the invention, the swollen portion may be attached to the underside of the reflective surface of the reflective mirror so that the center of the spherical surface of the swollen portion substantially matches an intersection between the illumination optical axis and the reflective surface of the reflective mirror.

According to this exemplary aspect of the invention, because the swollen portion is attached to the underside of the reflective surface of the reflective mirror so that the center of the spherical surface of the swollen portion substantially matches the intersection between the illumination optical axis and the reflective surface of the reflective mirror, the amount of displacement of the optical axis of the light beams reflected by the reflective mirror can be reduced and the orientation of the reflective mirror can be adjusted more precisely when the mirror orientation adjustment lever is moved to adjust the orientation of the reflective mirror.

In an optical device of an exemplary aspect of the invention, groove portions into which the reflective mirror is insertable may be formed in the side wall along a planar direction of the reflective mirror.

According to this exemplary aspect of the invention, because the groove portions are formed in the side wall, the reflective mirror can be disposed at the predetermined position by sliding the reflective mirror along the groove portions. Thus, labor to dispose the reflective mirror can be done more easily.

In an optical device of an exemplary aspect of the invention, the optical device may include urging members that are intervened between inner side surfaces of the groove portions and the reflective surface of the reflective mirror, and which urge the reflective mirror towards the side wall.

Here, examples of the urging members include spring plates or elastic members made of rubber.

According to this exemplary aspect of the invention, because the urging members are intervened between the inner side surface of the groove portions and the reflective surface of the reflective mirror, the reflective mirror is urged towards the side wall. The swollen portion attached to the reflective mirror and the concavely curved surface of the side wall can be brought into contact with an appropriate urging force, whereby the rotation and sliding of the swollen portion on the concavely curved surface can be done smoothly. Thus, the orientation of the reflective mirror can be smoothly adjusted.

In an optical device of an exemplary aspect of the invention, a concave portion that is recessed outward may be formed in the side wall in correspondence to a position where the mirror orientation adjustment lever is disposed.

According to this exemplary aspect of the invention, because the concave portion is formed in the side wall, the mirror orientation adjustment lever can be smoothly moved by forming the concave portion so that the mirror orientation adjustment lever and the side wall do not interfere when the mirror orientation adjustment lever is moved in order to adjust the orientation of the reflective mirror. Specifically, the orientation of the reflective mirror can be smoothly adjusted.

Also, by injecting an adhesive into this concave portion after the orientation of the reflective mirror has been adjusted, the mirror orientation adjustment lever and/or the swollen portion and the side wall can be adhered and fixed together, whereby the reflective mirror can be easily fixed to the optical parts-use casing.

In an optical device of an exemplary aspect of the invention, the optical parts-use casing may be configured by a vessel-like parts housing member that houses the plural optical parts and a cover member that closes off an open portion of the parts housing member, and for an opening to be formed in the cover member in correspondence to the position where the mirror orientation adjustment lever is disposed, so that when the reflective mirror is disposed at the disposition position, a distal end of the mirror orientation adjustment lever protrudes via the opening in the cover member.

According to this exemplary aspect of the invention, because the distal end of the mirror orientation adjustment lever protrudes via the opening in the cover member when the parts housing member and the cover member are connected, the mirror orientation adjustment lever protruding via the opening in the cover member can be moved even after all of the optical parts have been disposed inside the parts housing member and the open portion of the parts housing member has been closed off by the cover member. Specifically, the orientation of the reflective mirror can be adjusted. Thus, the manufacture of the optical device can be completed after adjusting the orientation of the reflective mirror, and the manufacture of the optical device can be done rapidly.

A projector of an exemplary aspect of the invention includes: a light modulation device that forms an optical image by modulating, in accordance with image information, light beams emitted from a light source; a projection optical device that magnifies and projects the optical image formed by the light modulation device; and the above-described optical device.

According to this exemplary aspect of the invention, because the projector is disposed with the above-described optical device, action and effects that are the same as those of the optical device can be obtained.

DETAILED DESCRIPTION OF EXEMPLARY EMBODIMENTS

An exemplary embodiment of the invention will be described below on the basis of the drawings.

(1) External Configuration of Projector 1

Figure 1:
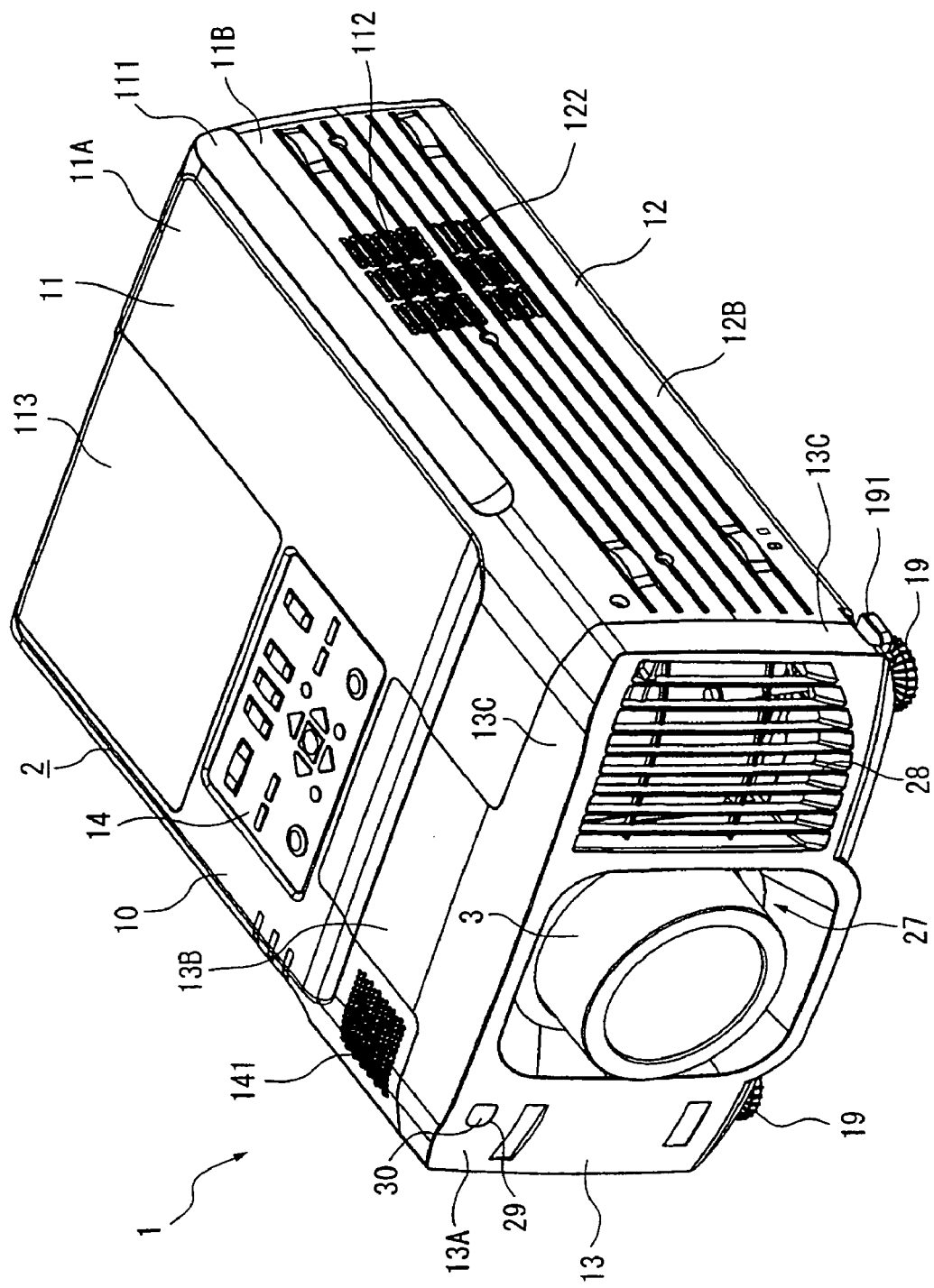
FIG. 1 is a schematic when a projector disposed with an optical device pertaining to an exemplary embodiment of the invention is seen from above.
Figure 2:
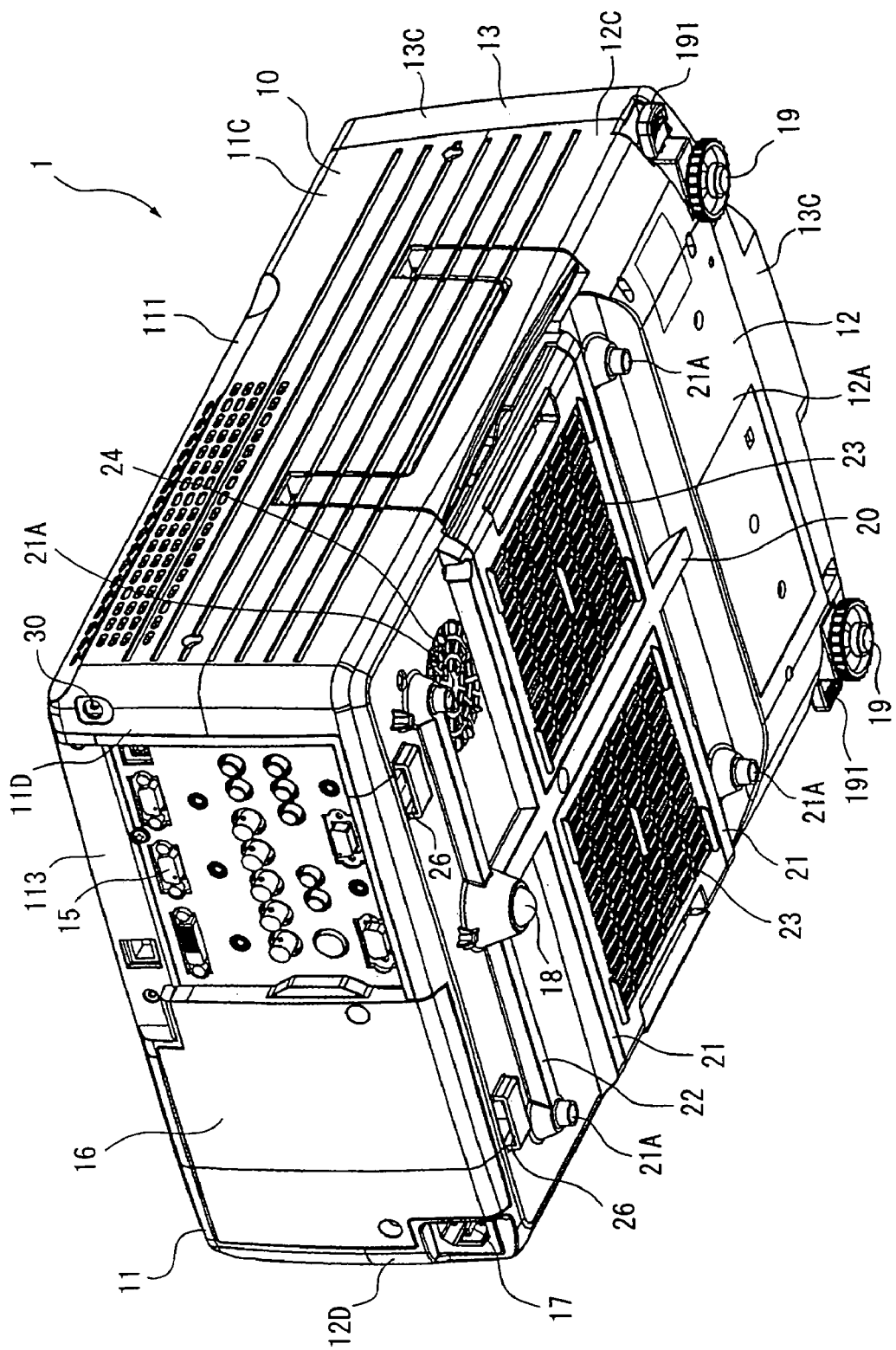
FIG. 2 is a schematic when the projector in an exemplary embodiment is seen from below.

FIGS. 1 and 2 show a projector 1 including an optical device pertaining to an exemplary aspect of the invention. FIG. 1 is a schematic seen from above the front side, and FIG. 2 is a schematic seen from below the rear side.

The projector 1 is an optical apparatus that modulates, in accordance with image information, light beams emitted from a light source and magnifies and projects the modulated light beams onto a projection surface, such as a screen. The projector 1 is disposed with an external case 2 that houses a device body including a later-described optical device and a projection lens 3 that is exposed through the external case 2. The projector 1 is disposed in a large-scale premises or public space and provides image information to numerous viewers by displaying projection images on a large screen.

The projection lens 3 is disposed with a function as a projection optical device that uses later-described liquid crystal panels, serving as light modulation devices, to magnify and project optical images formed by modulating, in accordance with image information, the light beams emitted from the light source. The projection lens 3 is configured as a composite lens in which plural lenses are housed inside a cylindrical tube.

The external case 2 is configured by planar face pieces 10, which cover the device body and form a rectangular parallelepiped shape whose depth dimension along the projection direction is larger than the axial-direction dimension orthogonal to the depth dimension, and an unillustrated frame body, which bears the case strength.

The planar face pieces 10 are disposed with an upper case 11 that covers an upper portion of the device body, a lower case 12 that covers a lower portion of the device body, and a front case 13 that covers a front portion of the device body. These cases 11 to 13 are integrally molded products made of synthetic resin formed by injection molding.

The upper case 11 is disposed with a casing upper surface portion 11A that covers the upper portion of the device body, casing side surface portions 11B and 11C that substantially drop from width-direction end portions of the casing upper surface portion 11A, and a casing rear surface portion 11D that substantially drops from a rear end portion of the casing upper surface portion 11A.

Edge portions, where the casing upper surface portion 11A and the casing side surface portions 11B and 11C of the upper case 11 intersect, are chamfered from a substantial center of the projection direction of the projector 1 towards the rear end side, and concave portions 111 that are concavely recessed along the edges are formed. The concave portions 111 are formed so that when two of the projectors 1 are stacked, pipe-like support members that couple together the two projectors 1 can be inserted therein.

Also, slit-like open portions 112 to introduce cooling air are formed in the casing side surface portion 11B.

An operation panel 14 to conduct operations to start and adjust the projector 1 is disposed in a substantially center portion of the casing upper surface portion 11A. The operation panel 14 is disposed with plural switches including a start switch and adjustment switches to adjust image and audio. By operating the adjustment switches on the operation panel 14, image quality and volume can be adjusted at the time of projection by the projector 1.

Also, plural holes 141 are formed in a projection-direction front of the casing upper surface portion 11A, and a speaker for audio output is housed therein.

The operation panel 14 and the speaker are electrically connected to a later-described control board configuring the device body, and operation signals resulting from the operation panel 14 are processed by this control board.

The casing rear surface portion 11D is configured in a frame shape whose substantial front is open. A connector group 15 to input image signals is exposed in this open portion, and the portion adjacent to the connector group 15 serves as an open portion housing a light source device. Ordinarily, the open portion is covered by a cover member 16 to house the light source device. The connector group 15 is electrically connected to the later-described control board, and signals inputted via the connector group 15 are processed by the control board.

Also, a cover member 113, which is detachable from the upper case 11, is attached to a rear end portion of the casing upper surface portion 11A and an upper end portion of the casing rear surface portion 11D. An expansion board, such as a LAN board, can be inserted inside the cover member 113.

The lower case 12 is configured substantially symmetrically with the upper case 11 around an engagement surface with the upper case 11, and is disposed with a casing bottom surface portion 12A, casing side surface portions 12B and 12C, and a casing rear surface portion 12D.

Additionally, the casing side surface portions 12B and 12C and the casing rear surface portion 12D engage, at upper end portions thereof, with lower end portions of the casing side surface portions 11B and 11C and the casing rear surface portion 11D of the upper case 11. Similar to the casing rear surface portion 11D of the upper case 11, a substantial front of the casing rear surface portion 12D is open, the connector group 15 is exposed through this open portion after engagement, and the cover member 16 is attached across both open portions.

Also, an open portion is formed in a corner portion of the casing rear surface portion 12D, and an inlet connector 17 is exposed through this open portion.

Moreover, open portions 122 are formed at positions in the casing side surface portion 12B corresponding to the open portions 112 formed in the casing side surface portion 11B of the upper case 11.

A fixed leg portion 18 is disposed in the casing bottom surface portion 12A in a substantial center at the rear end side of the projector 1, and adjustable leg portions 19 are disposed at both width-direction ends at the front side.

The adjustable leg portions 19 are configured by shaft-like members that retractably project outward from the casing bottom surface portion 12A. The shaft-like members themselves are housed inside the external case 2. The amount that the adjustable leg portions 19 project from, or are retracted within, the casing bottom surface portion 12A can be adjusted by operating adjustment buttons 191 disposed in the side surface portions of the projector 1.

Thus, the vertical position of the projection image emitted from the projector 1 can be adjusted to form a projection image at an appropriate position.

Also, a convex rib-like portion 20, which extends along the projection direction in a substantial center of the casing bottom surface portion 12A, and plural rib-like portions 21 and 22, which extend along the width direction of the projector 1 so as to be orthogonal to the rib-like portion 20, are formed in the casing bottom surface portion 12A. Additionally, air intake-use open portions, the details of which will be described later, to take in cooling air from the outside, are formed in intermediate portions between the two rib-like portions 21 and covered by filters 23. An air intake-use open portion to take in cooling air 24 is also formed at a rear end side of the air intake-use open portions covered by the filters 23, but does not have a configuration covered by a filter.

Screw holes 21A are formed in four places at end portions of the rib-like portions 21 and 22 extending along the width direction of the projector 1. Ceiling suspension-use fittings are disposed in the screw holes 21A when suspending the projector 1 from a ceiling.

Moreover, engagement portions 26 are formed in a device rear end side end edge of the casing bottom surface portion 12A. A cover member, to cover the connector group 15 to reduce the likelihood or prevent dust from adhering to the connectors, is attached to the engagement portions 26.

The front case 13 is disposed with a front surface portion 13A and an upper surface portion 13B. A rib 13C that extends away from the front surface portion 13A is formed at an outer peripheral portion of the front surface portion 13A. The rib 13C engages with projection-direction front end sides of the upper case 11 and the lower case 12.

The front surface portion 13A is slanted at the device rear end side from the casing bottom surface portion 12A of the lower case 12 towards the casing upper surface portion 11A of the upper case 11, and this direction is slanted so as to move away from the projection surface. The reason for this is to make it difficult for dust to adhere to the front case 13 because the front surface portion 13A of the front case 13 faces bottom when the projector 1 is suspended from a ceiling, and is also in consideration of the fact that maintenance is more difficult when the projector 1 is suspended from a ceiling than when the projector 1 is normally disposed.

An open portion 27 is formed in a substantial center portion of the front surface portion 13A, and the projection lens 3 is exposed through this open portion 27.

Slit-like open portions 28 are formed adjacent to the open portion 27, and air that has cooled the inside of the device body of the projector 1 is discharged through the open portions 28.

Moreover, a hole 29 is formed in the vicinity of a corner portion of the front surface portion 13A, and a light-receiving portion 30, to receive operation signals from an unillustrated remote controller, is disposed in the hole 29.

In the present exemplary embodiment, a light-receiving portion 30 is also disposed at the rear surface side of the projector 1, so that as shown in FIG. 2, there is a light-receiving portion 30 in a corner portion of the casing rear surface portion 11D of the upper case 11.

Thus, when the remote controller is used, the operation signals of the remote controller can be received from both the device front surface side and the device rear surface side.

The upper surface portion 13B extends as far as a substantial center of the casing upper surface portion 11A of the upper case 11, and specifically reaches the vicinity of a base end portion of the projection lens 3. But this is not shown. The reason for this is to enable the projection lens 3 to be replaced simply by removing the front case 13 when the projection lens 3 is to be replaced. When the front case 13 is removed from the upper case 11 and the lower case 12, the upper surface portion 13B is removed and opened, and the base portion attachment portion of the projection lens 3 is exposed.

(2) Internal Configuration of Projector 1

Figure 3:
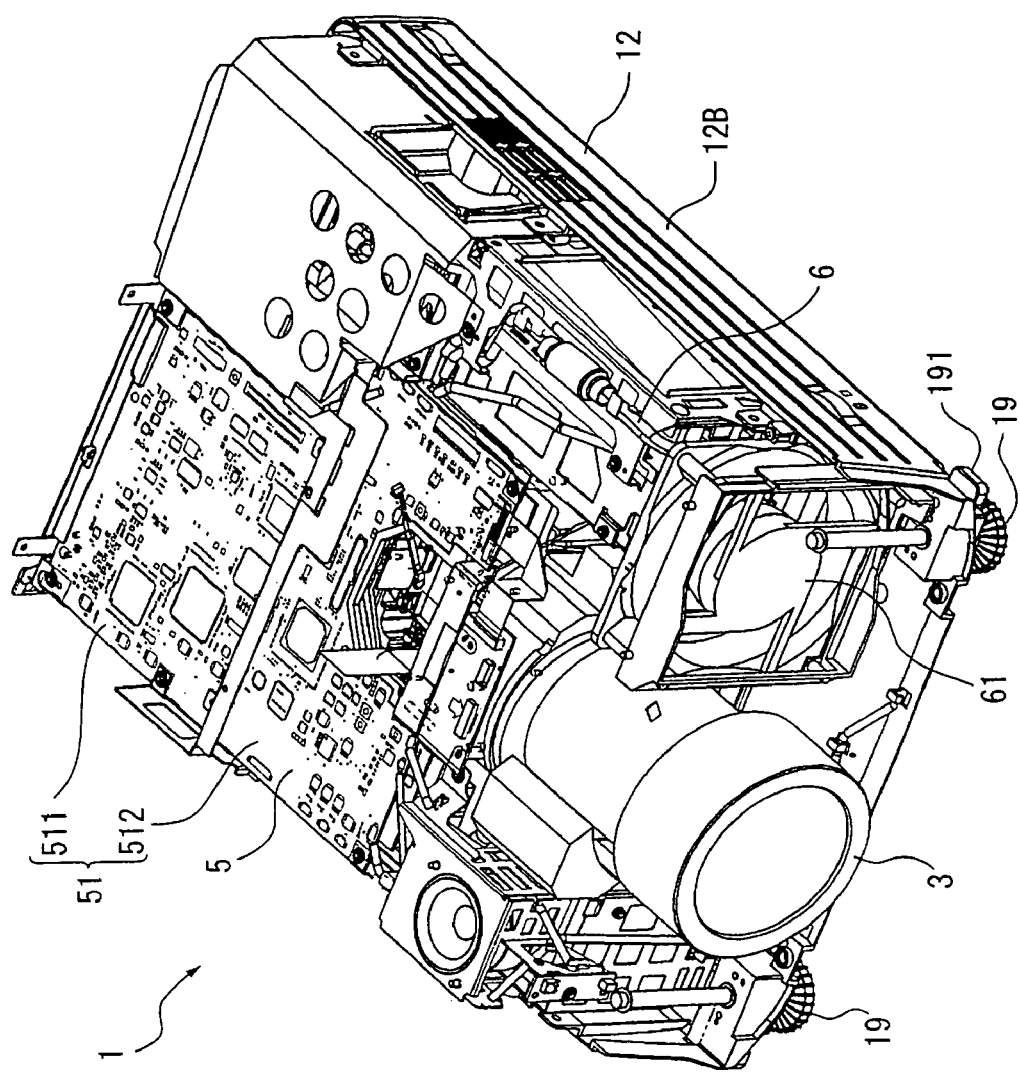
FIG. 3 is a schematic showing the inside of the projector in an exemplary embodiment.
Figure 4:
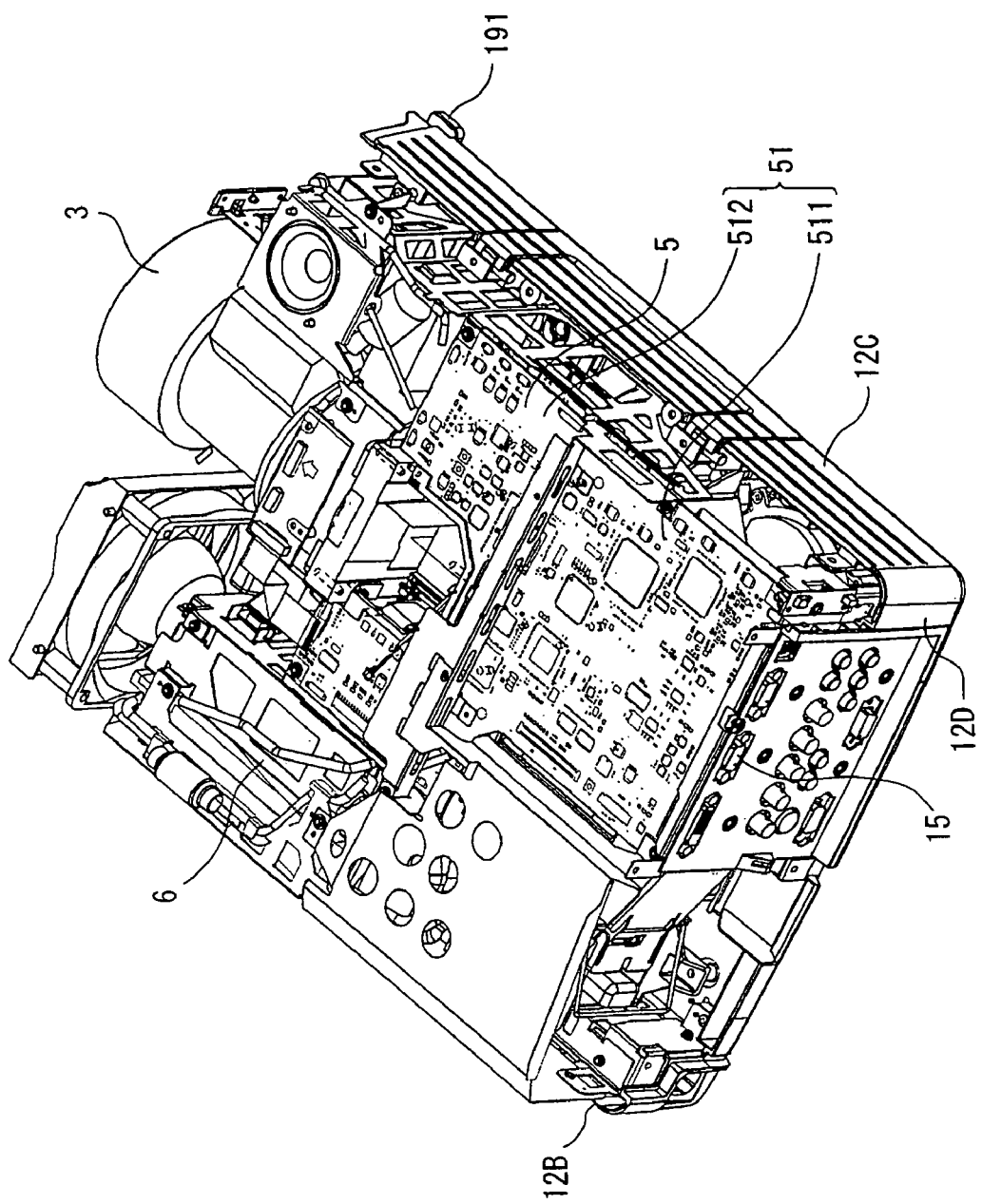
FIG. 4 is a schematic showing the inside of the projector in an exemplary embodiment.
Figure 5:
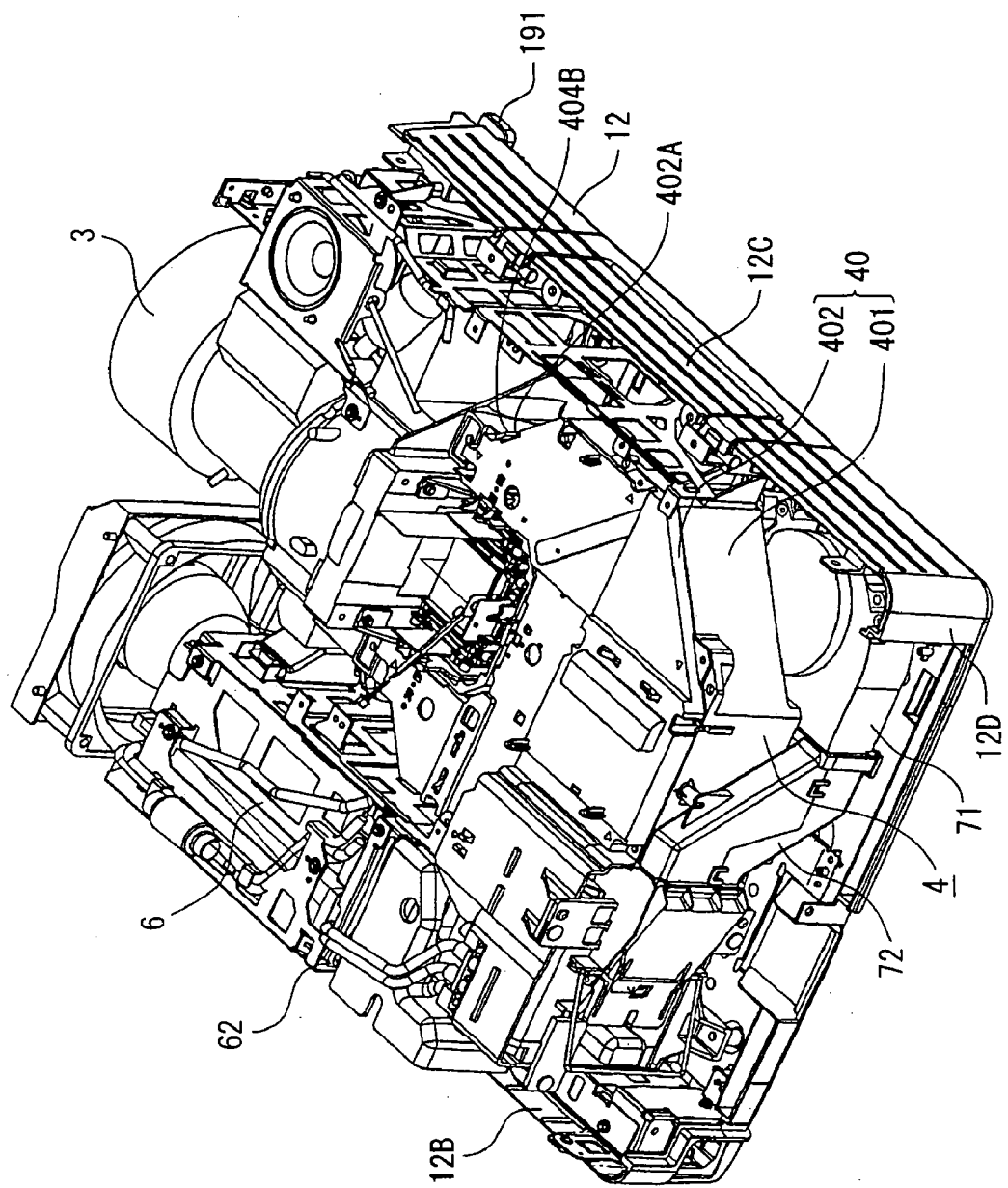
FIG. 5 is a schematic showing the inside of the projector in an exemplary embodiment.

As shown in FIGS. 3 to 5, the device body of the projector 1 is housed inside the external case 2. The device body is disposed with an optical unit 4 that serves as an optical device, a control board 5 and a power block 6.

(2-1) Structure of Optical Unit 4

Figure 7:
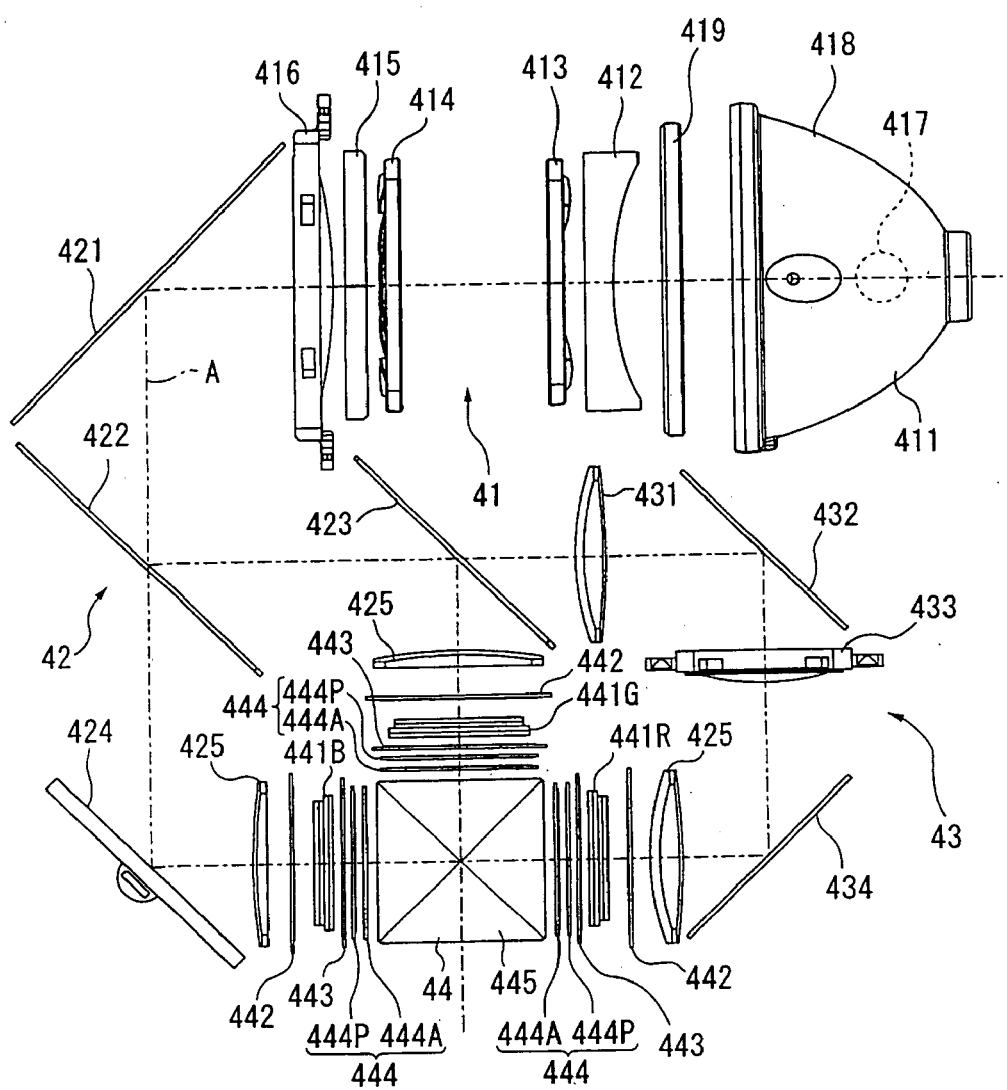
FIG. 7 is a schematic showing an optical system in the optical unit in an exemplary embodiment.

The optical unit 4 modulates, in accordance with image information, the light beams emitted from the light source device, forms an optical image and forms a projection image on a screen via the projection lens 3. As shown in FIG. 7, the optical unit 7 is functionally divided into an integrator illumination optical system 41, a color separation optical system 42, a relay optical system 43, an electrical optical system 44 in which a light modulation optical system and a color synthesis optical system are integrated, and an optical parts-use casing 40 that serves as an optical parts-use casing housing these optical parts 41 to 44. The optical unit 4 in the present exemplary embodiment is used in a 3-plate type projector and configured as a spatial color separation type optical unit that separates, into color light of three colors, the white light emitted from the light source inside the optical parts-use casing 40.

The integrator illumination optical system 41 is an optical system to equalize the illuminance, in a plane orthogonal to the illumination optical axis, of the light beams emitted from the light source, and is disposed with a light source device 411, a parallelization concave lens 412, a first lens array 413, a second lens array 414, a polarization conversion element 415 and an overlapping lens 416.

The light source device 411 is disposed with a light source lamp 417 serving as an emission light source, a reflector 418 and a front glass 419 that covers the light beam emission plane of the reflector 418. The light source device 411 reflects, with the parallelization concave lens 412 and the reflector 418, the radial light rays emitted from the light source lamp 417, changes the radial light rays into substantially parallel light rays and emits the substantially parallel light rays to the outside. In the present exemplary embodiment, a high-pressure mercury lamp is used as the light source lamp 417, but there are also instances where a metal halide lamp or a halogen lamp is used other than this. Also, in the present exemplary embodiment, a configuration is used where the parallelization concave lens 412 is disposed in the emission plane of the reflector 418 including an ellipsoidal mirror. But a parabolic mirror can also be used as the reflector 418.

The first lens array 413 is disposed with a configuration where small lenses, having substantially rectangular contours when seen in the illumination optical axis direction, are arranged in a matrix. Each small lens separates the light beams emitted from the light source lamp 417 into partial light beams and emits the partial beams in the illumination optical axis direction.

The second lens array 414 is disposed with a configuration where small lenses are arranged in a matrix. Together with the overlapping lens 416, the second lens array 414 includes the function of imaging, onto liquid crystal panels 441R, 441G and 441B, the images of each small lens of the first lens array 413.

The polarization conversion element 415 converts, into polarization light of a constant direction, the light from the second lens array 414. Thus, the use efficiency of the light by the electrical optical device 44 is raised.

Specifically, the partial light beams converted to polarization light of a first type by the polarization conversion element 415 are finally substantially overlapped onto the liquid crystal panels 441R, 441G and 441B of the electrical optical device 44 by the overlapping lens 416. In a projector using liquid crystal panels 441R, 441G and 441B of the type that modulate polarization light, only polarization light of one type can be used, so that substantially half of the light beams from the light source lamp 417 emitting random polarization light is not used. For this reason, by using the polarization conversion element 415, all of the light beams emitted from the light source lamp 417 are converted to polarization light of one type, and the use efficiency of the light in the electrical optical device 44 is raised. Such a polarization conversion element 415 is introduced in JP-A-8-304739, for example.

The color separation optical system 42 is disposed with a reflective mirror 421 that bends the light beams emitted from the integrator illumination optical system 41, two dichroic mirrors 422 and 423, and a reflective mirror 424. The color separation optical system 42 includes the function of separating, with the dichroic mirrors 422 and 423, the plural partial light beams emitted from the integrator illumination optical system 41 into color light of the three colors of red (R), green (G) and blue (B). The details will be described later, but the orientation of the reflective mirror 424 with respect to a parts housing member 401 can be adjusted.

The relay optical system 43 is disposed with an incident-side lens 431, a relay lens 433, and reflective mirrors 432 and 434. The relay optical system 43 includes the function of guiding red light, which is color light separated by the color separation optical system 42, to the liquid crystal panel 441R.

At this time, the dichroic mirror 422 of the color separation optical system 42 reflects the red color light component and the green color light component and transmits the blue color light component of the light beams emitted from the integrator illumination optical system 41. The blue color light transmitted by the dichroic mirror 422 is reflected by the reflective mirror 424, passes through the field lens 425 and reaches the blue color-use liquid crystal panel 441B. The field lens 425 converts the partial light beams emitted from the second lens array 414 into light beams that are parallel with respect to the central axis thereof (main optical axis). The same is true of the other field lenses 425 disposed at the light incident sides of the liquid crystal panels 441G and 441R.

Also, with respect to the red color light and the green color light that reflected the dichroic mirror 422, the green color light is reflected by the dichroic mirror 423, passes through the field lens 425 and reaches the green color-use liquid crystal panel 441G. The red light is transmitted through the dichroic mirror 423, passes through the relay optical system 43, further passes through the field lens 425 and reaches the red color light-use liquid crystal panel 441R.

The reason that the relay optical system 43 is used for the red color light is to reduce the likelihood or prevent a drop in the use efficiency of the light resulting from diffusion of the light because the length of the optical path of the red color light is longer than the lengths of the optical paths of the light of the other colors. Specifically, this is because the partial light beams made incident at the incident-side lens 431 are transmitted as is to the field lens 425. The relay optical system 43 has a configuration that passes the red color light of the light of the three colors, but the relay optical system 43 is not limited thereto. For example, it may have a configuration that passes the blue color light.

The electrical optical device 44 forms a color image by modulating, in accordance with image information, the incident light beams. The electrical optical device 44 is disposed with three incident-side polarization plates 442 at which the light of each color separated by the color separation optical system 42 is made incident, the liquid crystal panels 441R, 441G and 441B that serve as light modulation devices disposed at the rear stages of the incident-side polarization plates 442, angle-of-visibility correction plates 443 and emission-side polarization plates 444 that are disposed are the rear stages of the liquid crystal panels 441R, 441G and 441B, and a cross dichroic prism 445 that serves as a color synthesis optical system.

Figure 8:
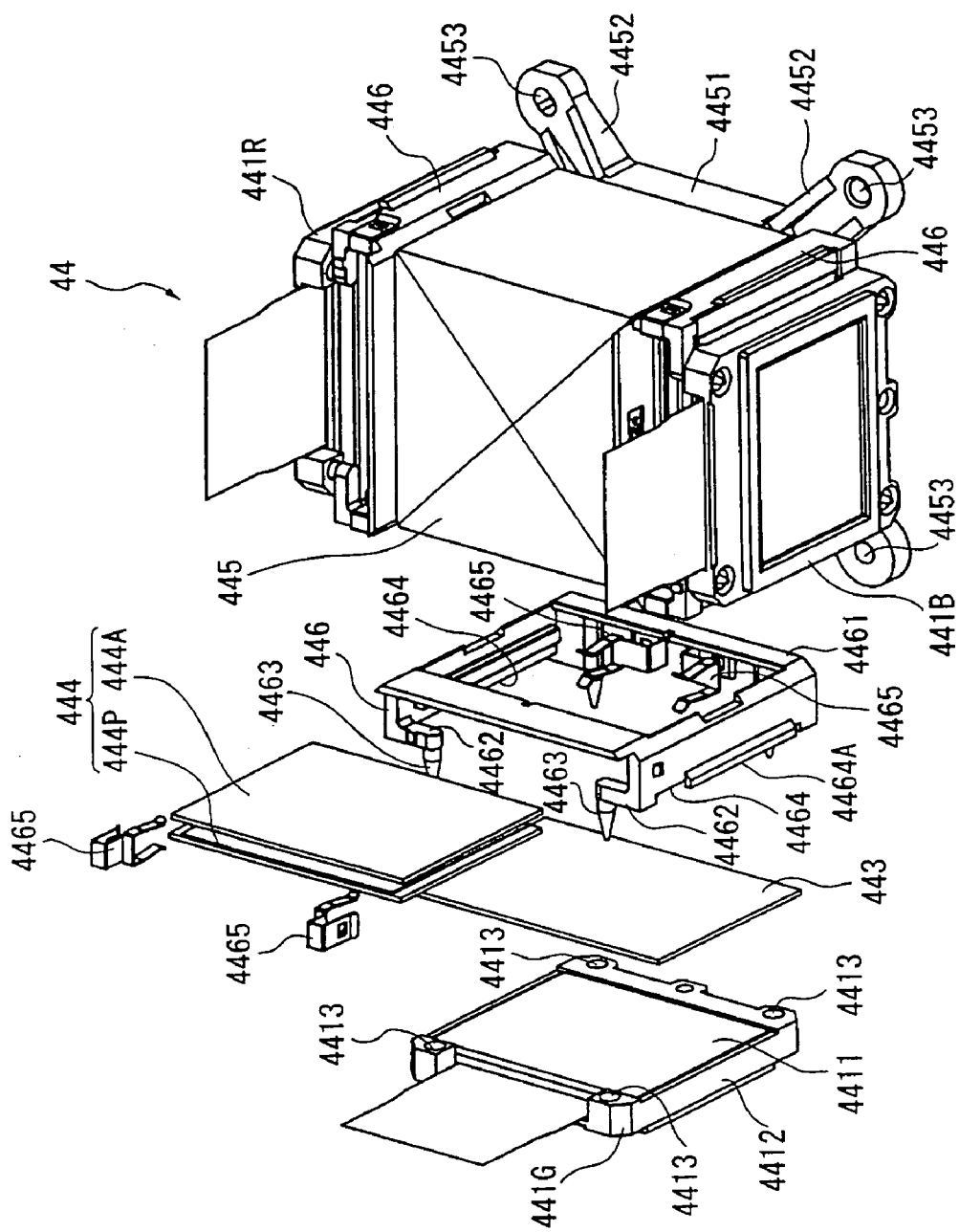
FIG. 8 is a schematic showing an electrical optical device in an exemplary embodiment.

The liquid crystal panels 441R, 441G and 441B use polysilicon TFTs as switching elements, for example. As shown in FIG. 8, using the liquid crystal panel 441G as an example, the liquid crystal panel 441G is disposed with a panel body 4411 and a retention frame 4412 that houses the panel body 4411. In the following description, no particular reference will be made in regard to the liquid crystal panels 441R and 441B. But they have configurations that are substantially the same as that of the liquid crystal panel 441G.

Although it is not shown, the panel body 4411 is disposed with a pair of transparent substrates that face each other, with the space between the transparent substrates being filled and sealed with liquid crystal. Dustproof glass is adhered to the incident side and emission side of the pair of transparent substrates.

The retention frame 4412 is a member including a concave portion housing the panel body 4411. Holes 4413 are formed in the four corner portions of the retention frame 4412.

The incident-side polarization plates 442 (see FIG. 7) disposed at the front stages of the liquid crystal panels 441R, 441G and 441B transmit only polarization light of one direction and absorb the other light beams of the light of each color separated by the color separation optical system 42, and include a substrate, such as sapphire glass, to which a polarization film is adhered. Alternatively, the polarization film may be adhered to the field lenses 425 without using a substrate.

The angle-of-visibility correction plate 443 includes a substrate having formed thereon an optical conversion film including the function of correcting the angle-of-visibility of the optical image formed by the liquid crystal panel 441G. By disposing the angle-of-visibility correction plate 443, light leakage in the case of a black screen is reduced and the contrast of the projection image is significantly enhanced.

The emission-side polarization plate 444 transmits only polarization light of a predetermined direction and absorbs the other light beams of the light beams optically modulated by the liquid crystal panel 441G. In the present exemplary embodiment, the emission-side polarization plate 444 is configured by two plates: a first polarization plate (pre-polarizer) 444P and a second polarization plate (analyzer) 444A. The reason the emission-side polarization plate 444 is configured with two plates in this manner is to cause the incident polarization light to be apportioned and absorbed by the first polarization plate 444P and the second polarization plate 444A, so that the heat generated by the polarization light is apportioned by both polarization plates 444P and 444A and overheating of these is suppressed.

The cross dichroic prism 445 synthesizes the optical images emitted from the emission-side polarization plates 444 and modulated for each the light of each color to form a color image.

In the cross dichroic prism 445, a dielectric multilayer film that reflects red color light and dielectric multilayer film that reflects blue color light are disposed is a substantial X shape along the interfaces of four right angle prisms, and the three color lights are synthesized by these dielectric multilayer films.

A prism fixing plate 4451 is fixed with an infrared hardening type adhesive to an underside of the cross dichroic prism 445. The prism fixing plate 4451 is disposed with leg portions 4452 that extend along diagonals of the cross dichroic prism 445, and holes 4453 are formed in distal end portions of the leg portions 4452.

The electrical optical device 44 is joined and fixed to an L-shaped horizontal part of the head body 403 with unillustrated screws inserted into the hole 4453 portions.

The liquid crystal panel 441G, the angle-of-visibility correction plate 443, the first polarization plate 444P and the second polarization plate 444A are fixed with a panel fixing plate 446 to a light beam incident end surface of the cross dichroic prism 445.

The panel fixing plate 446 is disposed with a fixing portion body 4461, which has a substantial C shape when seen in plan view, and pins 4463 that project via arm portions 4462 from a distal end side of the fixing portion body 4461. Pedestals 4464, to which the angle-of-visibility correction plate 443 is fixed, and positioning portions 4464A, which extend along edges of the distal end sides of the C shape and serve as outer position references of the angle-of-visibility correction plate 443, are formed at the distal ends of the C shape of the fixing portion body 4461.

In an instance where the liquid crystal panel 441G, the angle-of-visibility correction plate 443, the first polarization plate 444P and the second polarization plate 444A are fixed by the panel fixing plate 446 to the light beam incident end surface of the cross dichroic prism 445, the first polarization plate 444P and the second polarization plate 444A are first inserted in the space inside the C shape of the fixing portion body 4461 and then fixed inside this space while the polarization plates 444P and 444A are urged by spring members 4465 so that they are disposed a constant distance apart.

Next, the end surface of the angle-of-visibility correction plate 443 is adhered to the pedestals 4464 with heat-conducting tape or an adhesive while positioning the outer position of the angle-of-visibility correction plate 443 with the positioning portions 4464A. Thereafter, the panel fixing plate 446 is fixed to the light beam incident end surface of the cross dichroic prism 445.

Then, the infrared hardening adhesive is applied to the pins 4463 of the panel fixing plate 446. The pins 4463 are inserted through the holes 4413 of the liquid crystal panel 441G in a state where the infrared hardening adhesive has not hardened.

By the same process, the liquid crystal panels 441R and 441B are also fixed to panel fixing plates 446 in a state where the infrared hardening adhesive has not hardened. Each color light of red, green and blue is guided to the liquid crystal panels 441R, 441G and 441B, and mutual positional adjustment of the liquid crystal panels 441R, 441G and 441B is conducted while observing each color light emitted from the light beam emission end surface of the cross dichroic prism 445. When the positional adjustment ends, the infrared hardening adhesive is irradiated with infrared light, and positional fixing of the liquid crystal panels 441R, 441G and 441B is conducted.

Figure 6:
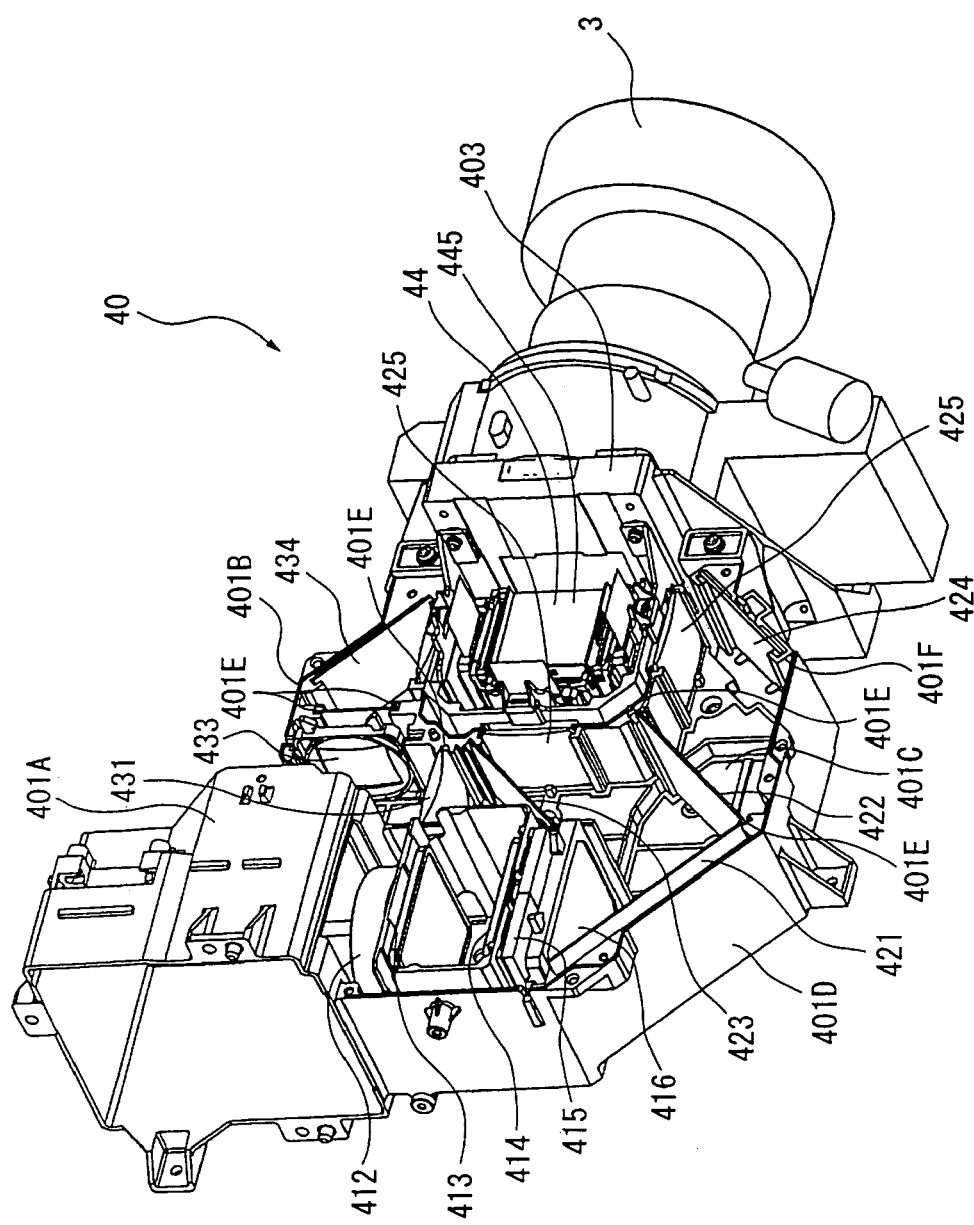
FIG. 6 is a schematic showing the inside of an optical unit in an exemplary embodiment.

As shown in FIGS. 5 and 6, the optical parts-use casing 40 is disposed with the parts housing member 401, which serves as a casing body, and a cover member 402 that covers an open portion of the parts housing member 401. The parts housing member 401 and the cover member 402 are synthetic resin products formed by injection molding.

As shown in FIG. 6, the parts housing member 401 is disposed with a light source housing portion 401A, in which the later-described light source device is housed, and a parts housing portion 401B, which houses optical parts. The parts housing portion 401B is formed in a vessel shape including a bottom surface portion 401C and a side wall portion 401D, with the top portion being open. Plural groove portions 401E and a reflective mirror disposition portion 401F, where the reflective mirror 424 is disposed, are disposed at the side wall portion 401D. Various optical parts excluding the reflective mirror 424 are slidingly fit from above into the groove portions 401E. Also, the reflective mirror disposition portion 401F is a portion where the reflective mirror 424 is disposed, and will be described at the same time that the retention structure of the reflective mirror 424 is described. Additionally, due to the groove portions 401E and the reflective mirror disposition portion 401F, the optical parts are precisely disposed on an illumination axis A (FIG. 7) regulated within the optical parts casing 40.

As shown in FIG. 5, the cover member 402 has a planar shape corresponding to the parts housing member 401, and is configured as a cover member that covers the upper surface of the parts housing member 401. Also, plural open portions are formed in the cover member 402. For example, an open portion 402A, through which part of a later-described mirror orientation adjustment member that enables adjustment of the orientation of the reflective mirror 424 is exposed to the outside of the optical unit 4, is formed.

Also, a head body 403, that is made of metal and has a substantial L shape when seen from the side, is disposed at the light beam emission side end portion of the parts housing member 401. The electrical optical device 44 is attached to a horizontal portion of the L shape of the head body 403, and the base end portion of the projection lens 3 is joined and fixed to a vertical portion of the L shape.

(2-2) Structure of Control Board 5

As shown in FIGS. 4 and 5, the control board 5 is disposed with a main board 51 that is disposed so as to cover the upper side of the optical unit 4 and in two-tiers. A control portion body, such as a processor, is mounted on an upper board 51A. Drive-use ICs for the liquid crystal panels 441R, 441G and 441B are mounted on a lower board 51B. Also, although it is not illustrated, the control board 5 is disposed with an interface board that is connected at the rear end side of the main board 51 and stands on the casing rear surface portions 11D and 12D of the external case 2.

The connector group 15 is mounted at a rear surface side of the interface board. Image information input from the connector group 15 is output to the main board 51 via the interface board.

The processor on the main board 51 processes the input image information and then outputs a control command to the liquid crystal panel drive-use ICs. The drive-use ICs generate and output drive signals on the basis of the control command to drive the liquid crystal panels 441, whereby light modulation is conducted in accordance with the image information and optical images are formed.

(2-3) Structure of Power Block 6

The power block 6 is disposed adjacent to the optical unit 4 and extends along the projection direction of the external case 2 of the projector 1. Although it is not illustrated, the power block 6 is disposed with a power unit and a lamp drive unit.

The power unit supplies, to the lamp drive unit and the control board 5, power supplied from the outside via a power cable connected to the inlet connector 17.

The lamp drive unit is a conversion circuit to supply power with a stable voltage to the light source device 411. The commercial alternating current input from the power unit is commutated and converted by the lamp drive unit to become a direct current or alternating shortwave current, which is then supplied to the light source device 411.

As shown in FIG. 3, an exhaust fan 61 is disposed in front of the power block 6. Air that has cooled the constituent members inside the projector 1 is collected by the exhaust fan 61 and discharged to the outside of the device through the open portions 28 in the external case 2.

(2-4) Cooling Structure

Figure 9:
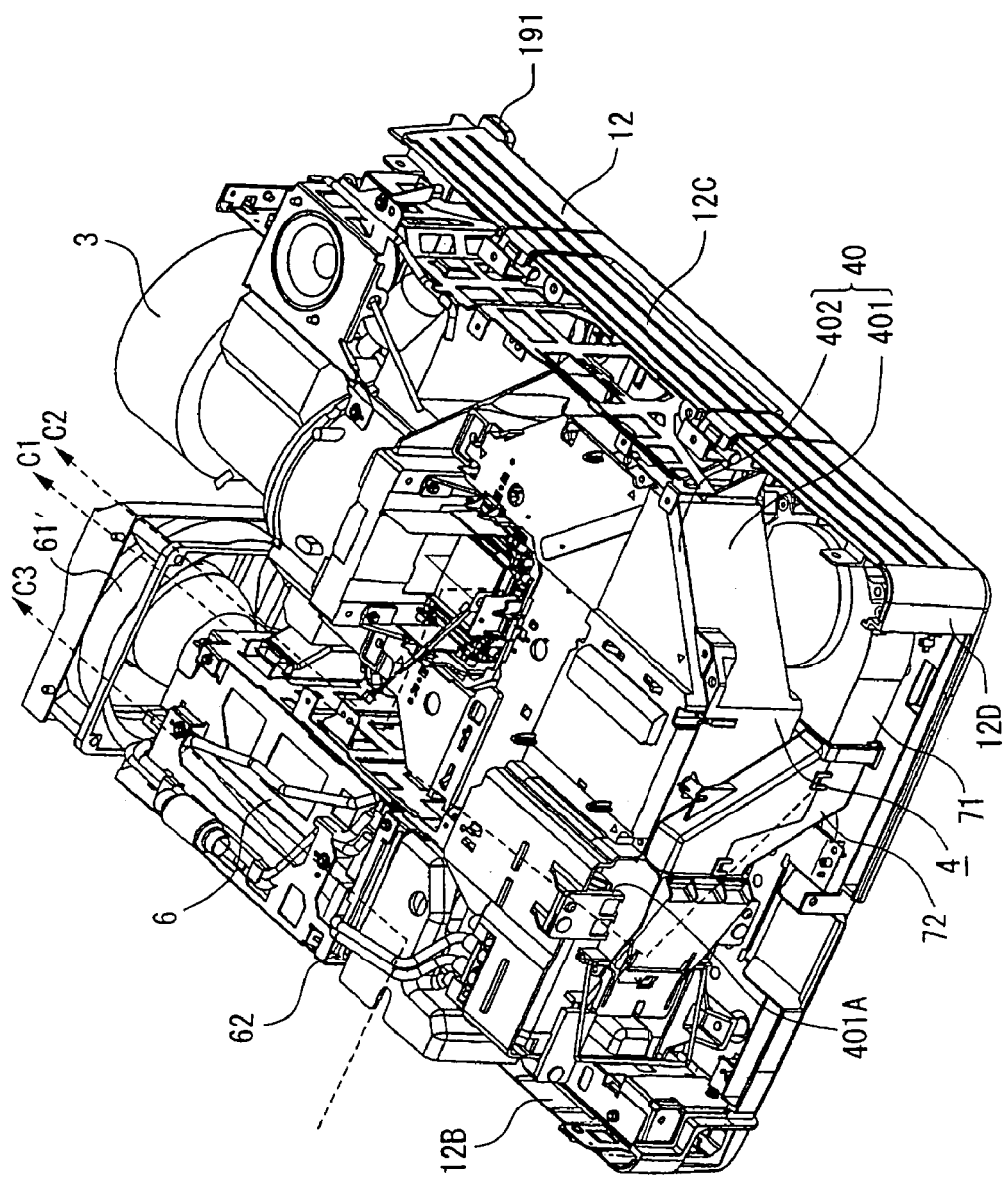
FIG. 9 is a schematic showing a cooling system of the projector in an exemplary embodiment.

Because the inside of the projector 1 is heated by heat from the light source device 411 and the power block 6, it is necessary to circulate cooling air inside the projector 1 to efficiently cool the light source device 411, the electrical optical device 44 and the power block 6. For this reason, in the present exemplary embodiment, three cooling flow paths C1, C2 and C3 are disposed as shown in FIG. 9.

The cooling flow path C1 is a flow path that cools the light source device 411 and the polarization conversion element 415 configuring the integrator illumination optical system 41. Cooling air taken in by a sirocco fan 71 disposed inside the device of an air intake-use open portion 24 in FIG. 2 is supplied by a duct 72 from in front of the light source housing portion 401A of the optical parts-use casing 40 to the light source device 411 and the polarization conversion element 415 to cool these. After cooling, the air the taken in by the exhaust fan 61 and discharged to the outside of the projector 1.

The cooling flow path C2 is a flow path that cools the electrical optical device 44 that conducts light modulation and color synthesis. Cooling air taken in by a sirocco fan (described later) disposed inside the device of an air intake-use open portion formed at the position where the filter 23 in FIG. 2 is disposed upward from below the electrical optical device 44 to cool the liquid crystal panels 441R, 441G and 441B, the incident-side polarization plates 442, the angle-of-visibility correction plates 443 and the emission-side polarization plates 444. After cooling, the air flows along the underside of the main board 51 and the casing upper surface portion 11A of the upper case 11, cools the circuit elements mounted on the main board 51, and is discharged to the outside by the exhaust fan 61.

The cooling flow path C3 is a flow path that cools the power block 6. Cooling air is taken in by an air intake fan 62 disposed at the rear end side of the power block 6 through the open portions 112 formed in the casing side surface portion 11B of the upper case 11 and the open portions 122 formed in the casing side surface portion 12B of the lower case 12. Part of the taken-in cooling air is supplied to the power unit and the lamp drive unit, and after cooling these, the cooling air is discharged to the outside by the exhaust fan 61.

(3) Retention Structure of Reflective Mirror 424

Next, the retention structure of the reflective mirror 424 will be described with reference to the drawings.

Figure 10:
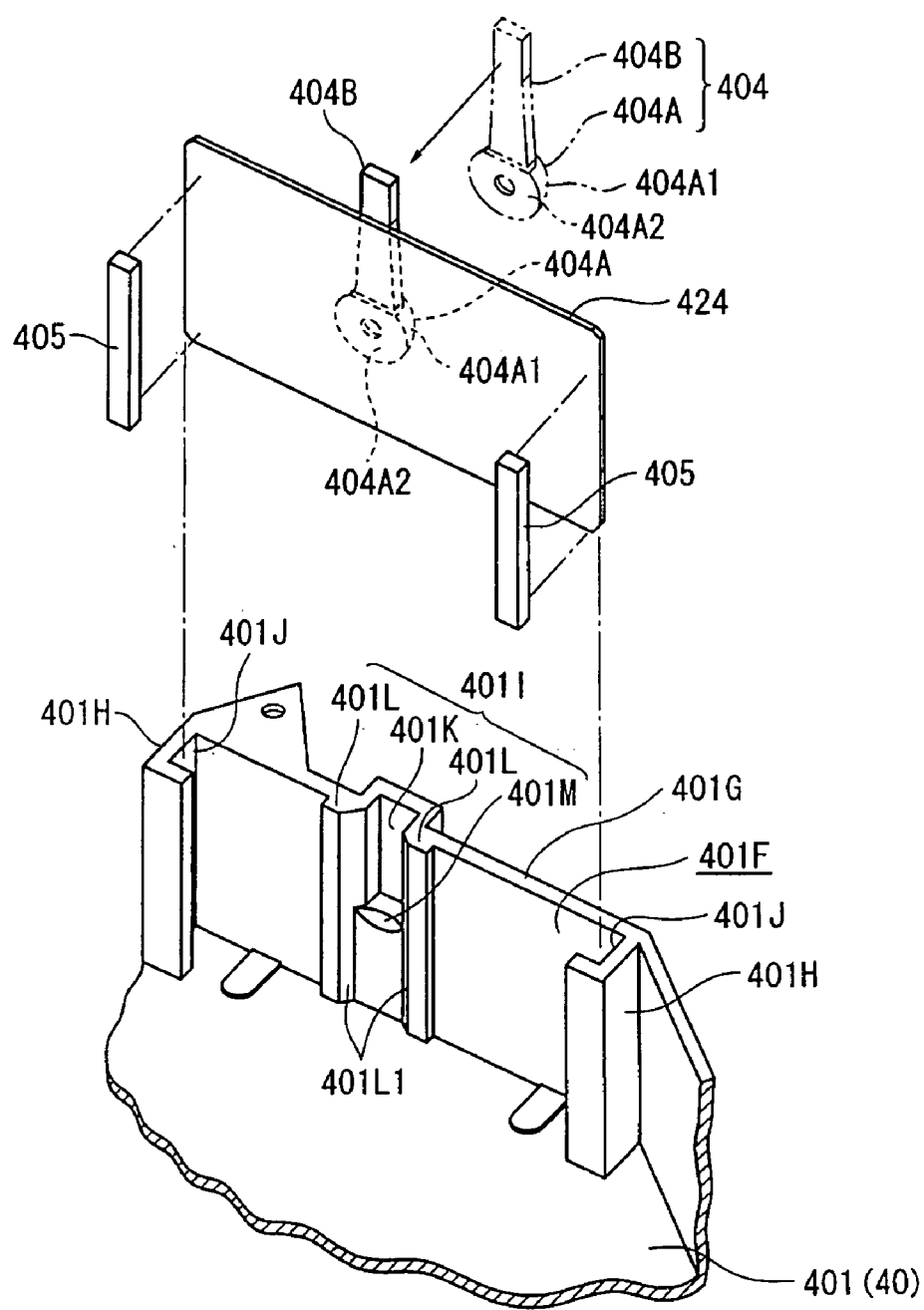
FIG. 10 is a schematic showing a retention structure of a reflective mirror in an exemplary embodiment.

FIG. 10 is a schematic showing the retention structure of the reflective mirror 424.

Figure 11:
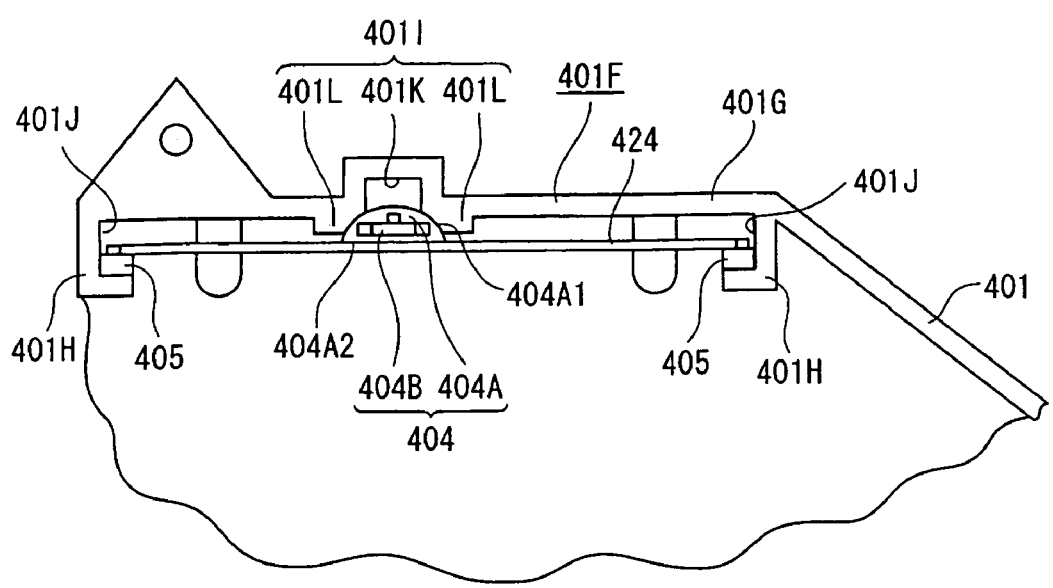
FIG. 11 is a schematic when the retention structure of the reflective mirror in an exemplary embodiment is seen from above.

FIG. 11 is a schematic when the retention structure of the reflective mirror 424 is seen from above.

As shown in FIG. 10 or FIG. 11, the reflective mirror 424 is disposed so that its orientation is adjustable towards the reflective mirror disposition portion 401F of the parts housing member 401 via a mirror orientation adjustment member 404 and urging members 405.

The mirror orientation adjustment member 404 adjusts the orientation of the reflective mirror 424 with respect to the illumination optical axis A (FIG. 7) in the parts housing member 401. As shown in FIG. 10 or FIG. 11, the mirror orientation adjustment member 404 is disposed with a swollen portion 404A and a mirror orientation adjustment lever 404B.

The swollen portion 404A is formed in a substantial semispherical shape. A planar surface opposite from a spherical surface 404A1 serves as an attachment surface 404A2, and the attachment surface 404A2 is adhered and fixed to the underside of the reflective surface of the reflective mirror 424, whereby the mirror orientation adjustment member 404 is fixed to the reflective mirror 424.

The mirror orientation adjustment lever 404B is formed in a substantial quadratic rod shape. One side surface of the mirror orientation adjustment lever 404B is substantially parallel to the attachment surface 404A2 of the swollen portion 404A. The mirror orientation adjustment lever 404B is integrally connected to the swollen portion 404A so as to be a step lower than the attachment surface 404A2. Additionally, when the mirror orientation adjustment member 404 is fixed to the reflective mirror 424, a gap is formed between the mirror orientation adjustment lever 404B and the reflective mirror 424 as shown in FIG. 10, and the mirror orientation adjustment lever 404B is disposed so as to extend upward from the swollen portion 404A so that a distal end of the mirror orientation adjustment lever 404B planarly protrudes from an upper end edge of the reflective mirror 424.

The swollen portion 404A and the mirror orientation adjustment lever 404B described above are an integrally molded product formed by injection-molding synthetic resin.

The urging members 405 are configured from silicon rubber, intervened between later-described groove portions in the reflective mirror disposition portion 401F and left and right side end portions of the reflective surface of the reflective mirror 424, and urge the reflective mirror 424 towards a later-described side wall of the reflective mirror disposition mirror 401F.

The reflective mirror disposition portion 401F is a portion to dispose the reflective mirror 424 at a predetermined position with respect to the internal illumination optical axis A (FIG. 7). As shown in FIG. 10 or FIG. 11, the reflective mirror disposition portion 401F is a side surface of the parts housing member 401, and is configured by a side wall 401G in the form of a substantially rectangle shape in plan view, a pair of standing ribs 401H, which are positioned at both left and right end edges of the side wall 401G, and a mirror receiving portion 401I, which is positioned at a substantial center portion of the side wall 401G in the left-right direction.

The cross sections of the pair of standing ribs 401H have substantial L shapes, and the standing ribs 401H are formed so that open portions of the L shapes face each other. Specifically, as shown in FIG. 10 or FIG. 11, groove portions 401J are formed by the pair of standing ribs 401H and the side wall 401G, and the reflective mirror 424 and the urging members 405 are slid from above into these groove portions 401J, whereby the reflective mirror 424 and the urging members 405 are disposed in the reflective mirror disposition portion 401F.

The mirror receiving portion 401I is a portion that receives the swollen portion 404A of the mirror orientation adjustment member 404 adhered and fixed to the underside of the reflective surface of the reflective mirror 424. As shown in FIG. 10, the mirror receiving portion 401I is configured by a concave portion 401K, a pair of protruding portions 401L and a spherical concave portion 401M serving as a concavely curved surface.

The concave portion 401K protrudes outward from a substantial center portion of the side wall 401G in the vertical direction towards an upper side end edge, and is formed so that the interior is recessed outward. Due to the concave portion 401K, the side wall 401G and the mirror orientation adjustment lever 404B of the mirror orientation adjustment member 404 can be prevented from interfering when the orientation of the reflective mirror 424 is to be adjusted.

The pair of protruding portions 401L are formed along open end edges of the concave portion 401K upward from the bottom of the side wall 401G, and protrude towards the inner side of the side wall 401G. Additionally, opposing corner portions of the pair of protruding portions 401L are chamfered so that slanted surfaces 401L1 are formed. Due to these slanted surfaces 401L1, the swollen portion 404A of the mirror orientation adjustment portion 404 adhered and fixed to the underside of the reflective surface of the reflective mirror 424 can be prevented from interfering with the side wall 401G when the reflective mirror 424 and the urging members 405 are slid from above into the groove portions 401J.

The spherical concave portion 401M is positioned at a lower side end surface corner portion of the concave portion 401K, and is formed in a concavely curved surface shape corresponding to the spherical surface 404A1 of the swollen portion 404A of the mirror orientation adjustment member 404.

Additionally, the spherical concave portion 401M contacts part of the swollen portion 404A adhered and fixed to the underside of the reflective surface of the reflective mirror 424 to support the reflective mirror 424 when the reflective mirror is disposed in the reflective mirror disposition portion 401F.

Next, the method of disposing the reflective mirror 424 in the reflective mirror disposition portion 401F will be described.

First, the mirror orientation adjustment member 404 is adhered and fixed to the underside of the reflective surface of the reflective mirror 424. At this time, the mirror orientation adjustment member 404 is adhered and fixed so that the center of the spherical surface of the swollen portion 404A of the mirror orientation adjustment member 404 is positioned at a substantial center position where the reflective mirror 424 is irradiated with the light beams (position corresponding to the illumination optical axis A (FIG. 7)).

Thereafter, the urging members 405 contact the left and right side end portions of the reflective surface of the reflective mirror 424, and the urging members 405 and the reflective mirror 424, to which the mirror orientation adjustment member 404 is attached, are slid and disposed in the groove portions 401J from above the reflective mirror disposition portion 401F. At this time, the mirror orientation adjustment member 404 attached to the reflective mirror 424 is guided along the slanted surfaces 401L1 of the pair of protruding portions 401L of the mirror receiving portion 401I, so that the swollen portion 404A is supported in the spherical concave portion 401M. In this state, the urging members 405 are compressed between the groove portions 401J and the reflective surface of the reflective mirror 424, and the reflective mirror 424 is urged by the urging members 405 towards the side wall 401G of the reflective mirror disposition portion 401F. Then, the spherical surface 404A1 of the swollen portion 404A of the mirror orientation adjustment member 404 attached to the reflective member 424 follows the concavely curved surface of the spherical concave portion 401M of the mirror receiving portion 401I, and the reflective mirror 424 is temporarily positioned in the reflective mirror disposition portion 401F.

Then, the cover member 402 is disposed at the open portion of the parts housing member 401 to cover the open portion of the parts housing member 401. It will be assumed that at this time, the other optical parts 41, 421 to 423, 425, 43 and 44 (including the head body 403 and the projection lens 3 fixed to the head body 403) are also housed in the parts housing member 401. In this state, the distal end of the mirror orientation adjustment lever 404B of the mirror orientation adjustment member 404 protrudes via the open portion 402A in the cover member 402 (FIG. 5).

Thereafter, the light source device 411 is lighted and the light beams are guided inside the optical parts-use casing 40. Then, the light beams are magnified and projected by the projection lens 3 via the optical parts 41 to 44, and the orientation of the reflective mirror 424 is adjusted by, for example, confirming the projection screen projected onto the screen.

Specifically, the distal end of the mirror orientation adjustment lever 404B protruding from the open portion 402A of the cover member 402 is grabbed with one's hand to move the mirror orientation adjustment lever 404B in the planar direction (e.g., forwards and backwards, left and right) of the cover member 402, whereby the swollen portion 404A of the mirror orientation adjustment member 404 pivots and slides on the spherical concave portion 401M of the reflective mirror disposition portion 401F so that the orientation of the reflective surface of the reflective mirror 424 is adjusted. At this time, the mirror orientation adjustment member 404 is adhered and fixed to the reflective mirror 424 so that the center of the spherical surface of the swollen portion 404A is in the position corresponding to the illumination optical axis A (FIG. 7) of the reflective mirror 424. Thus, when the orientation of the reflective mirror 424 is adjusted with the above method, the reflective surface of the reflective mirror 424 is rotated and adjusted around the illumination optical axis A (FIG. 7).

After the orientation of the reflective mirror 424 has been adjusted, adhesive is instantly injected between the mirror orientation adjustment member 404 and the reflective mirror disposition portion 401F via the open portion 402A in the cover member 402, and the swollen portion 404A of the mirror orientation adjustment member 404 and the spherical concave portion 401M are adhered and fixed together, whereby the reflective mirror 424 is positioned and fixed with respect to the reflective mirror disposition portion 401F.

In the preceding exemplary embodiment, the spherical concave portion 401M of the reflective mirror disposition portion 401F is made to support the swollen portion 404A by adhering and fixing the mirror orientation adjustment member 404 including the swollen portion 404A and the mirror orientation adjustment lever 404B to the underside of the reflective surface of the reflective mirror 424, whereby the reflective mirror 424 can be positioned in the reflective mirror disposition portion 401F, and the number of parts and the manufacturing cost can be reduced in comparison to a related art mirror retention structure with a large number of parts, such as two plate springs and two eccentric discs.

Also, by adhering and fixing the mirror orientation adjustment member 404 to the underside of the reflective surface of the reflective mirror 424, the labor to dispose the reflective mirror 424 in the reflective mirror disposition portion 401F can be done easily.

Moreover, the swollen portion 404A configuring the mirror orientation adjustment member 404 is configured as part of a spherical surface. The spherical concave portion 401M has a shape corresponding to the spherical surface 404A1 of the swollen portion 404A. The mirror orientation adjustment lever 404B planarly protrudes from the upper end edge of the reflective mirror 424. Thus, by grabbing the mirror orientation adjustment lever 404B with one's hand after the reflective mirror 424 has been disposed in the reflective mirror disposition portion 401F and moving the mirror orientation adjustment lever 404B, the swollen portion 404A rotates and slides on the spherical concave portion 401M around a hypothetical center of the spherical surface 404A1 so that the orientation of the reflective mirror 424 can be easily and precisely adjusted.

Here, the distal end of the mirror orientation adjustment lever 404B protrudes via the open portion 402A in the cover member 402 when the cover member 402 is connected to the parts housing member 401. Thus, the mirror orientation adjustment lever 404B protruding via the open portion 402A in the cover member 402 can be moved even after all of the optical parts 41 to 44 have been disposed inside the parts housing member 401 and the cover member 402 has been connected to the parts housing member 401. Specifically, the orientation of the reflective mirror 424 can be adjusted. Thus, the manufacture of the optical unit 4 can be completed after adjusting the orientation of the reflective mirror 424, and the manufacture of the optical unit 4 can be done rapidly.

Additionally, because the swollen portion 404A and the mirror orientation adjustment lever 404B of the mirror orientation adjustment member 404 are an integrally molded product, the number of parts can be further reduced, and the labor to attach the swollen portion 404A and the mirror orientation adjustment lever 404B to the reflective mirror 424 can be done easily. Specifically, the labor to dispose the reflective mirror 424 in the reflective mirror disposition portion 401F can be done more easily.

Here, because the mirror orientation adjustment lever 404B is formed a step lower with respect to the attachment surface 404A2 of the swollen portion 404A, a predetermined gap is formed between the mirror orientation adjustment lever 404B and the reflective mirror 424 when the mirror orientation adjustment member 404 is adhered and fixed to the reflective mirror 424. Thus, by pushing a tool, such as a driver, in this gap, the mirror orientation adjustment member 404 can be easily removed with respect to the reflective mirror 424, so that reworkability can be enhanced.

Also, because the mirror orientation adjustment member 404 is attached to the reflective mirror 424 so that the center of the spherical surface of the swollen portion 404A substantially matches the intersection between the illumination optical axis A and the reflective surface of the reflective mirror 424, the amount of displacement of the optical axis of the light beams reflected by the reflective mirror 424 can be reduced and the orientation of the reflective mirror 424 can be adjusted more precisely when the mirror orientation adjustment lever 404B is moved to adjust the orientation of the reflective mirror 424.

Moreover, because the groove portions 401J are formed in both the left and right end portions of the side wall 401G, the reflective mirror 424 can be easily disposed in the reflective mirror disposition portion 401F by sliding the reflective mirror 424 along the groove portions 401J, so that the labor to dispose the reflective mirror 424 can be done more easily.

Here, because the urging members 405 are intervened between the inner side surfaces of the groove portions 401J and both the left and right end portions of the reflective surface of the reflective mirror 424, the reflective mirror 424 is urged towards the side wall 401G, and the swollen portion 404A of the mirror orientation adjustment member 404, fixed and adhered to the reflective mirror 424 and the spherical concave portion 401M of the side wall 401G, can be brought into contact with each other with an appropriate urging force. Thus, the swollen portion 404A can be smoothly rotated and slid on the spherical concave portion 401M. Specifically, the orientation of the reflective mirror 424 can be smoothly adjusted.

Moreover, because the concave portion 401K is formed in the side wall 401G, the mirror orientation adjustment lever 404B and the side wall 401G can be prevented from interfering when the mirror orientation adjustment lever 404B is moved in order to adjust the orientation of the reflective mirror 424, and the mirror orientation adjustment lever 404B can be moved smoothly. Specifically, the orientation of the reflective mirror 424 can be smoothly adjusted.

Also, by instantly injecting the adhesive in the concave portion 401K after the orientation of the reflective mirror 424 has been adjusted, the swollen portion 404A and the spherical concave portion 401M can be adhered and fixed together, so that the reflective mirror 424 can be easily fixed to the reflective mirror disposition portion 401F.

Exemplary embodiments of the present invention have been described above, but the invention is not limited to these exemplary embodiments. Various enhancements and design changes are possible within a range that does not deviate from the gist of the invention.

In the preceding exemplary embodiment, the mirror orientation adjustment member 404 was adhered and fixed to the underside of the reflective surface of the reflective mirror 424, but the invention is not limited thereto and may also adopt a configuration where the mirror orientation adjustment member 404 is attached to the underside of the reflective surface of the reflective mirror 424 with a double-sided tape.

In the preceding exemplary embodiment, a configuration was described where the swollen portion 404A and the mirror orientation adjustment lever 404B were integrally formed, but the invention is not limited thereto. For example, the swollen portion 404A and the mirror orientation adjustment lever 404B may also be configured separately. In this instance, the mirror orientation adjustment lever 404B may be fixed at any position as long as the distal end thereof planarly protrudes from the upper end edge of the reflective mirror 424.

In the preceding exemplary embodiment, a configuration may also be adopted where the mirror orientation adjustment lever and the swollen portion are configured separately and the standing ribs 401H of the reflective mirror disposition portion 401F and the urging members 405 are omitted.

Figure 12:
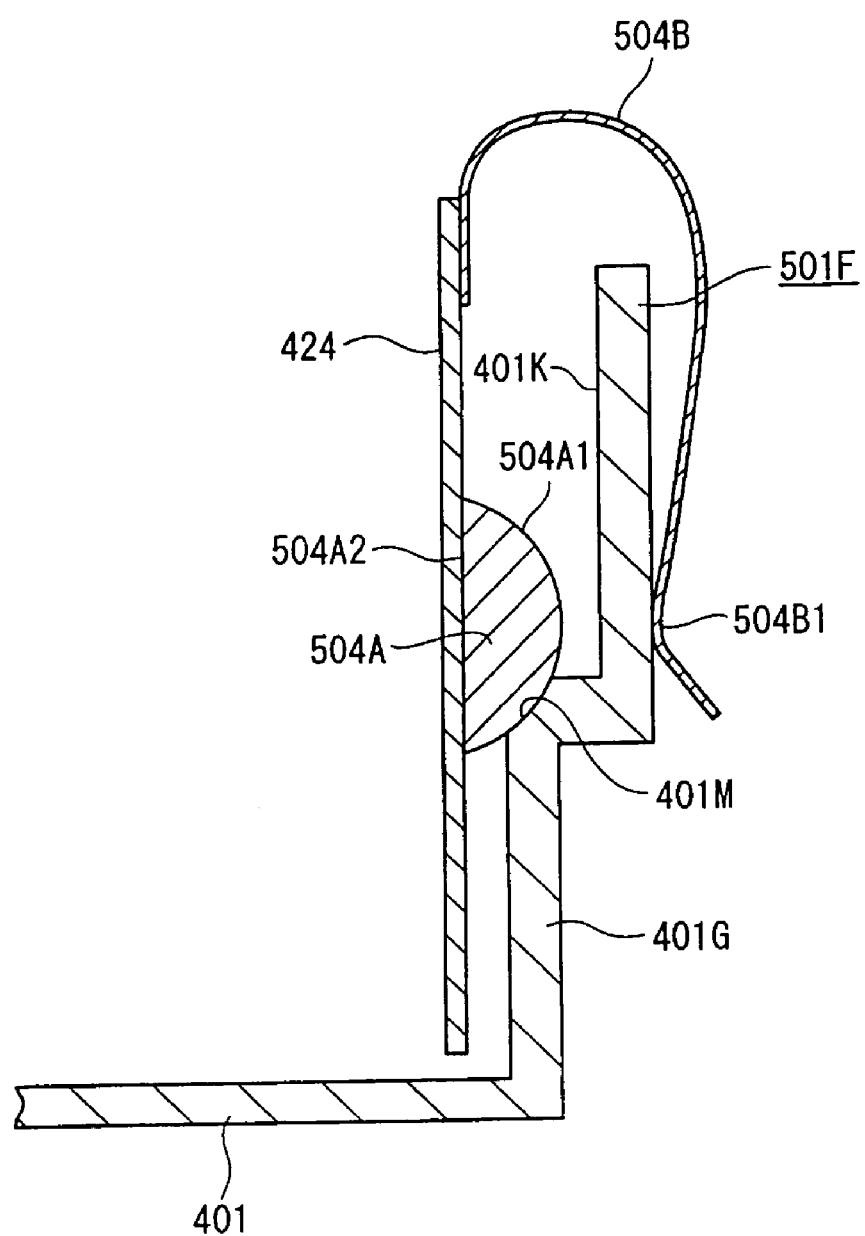
FIG. 12 is a schematic view showing a modified example of an exemplary embodiment.

Specifically, FIG. 12 is a schematic showing a modified example of the preceding exemplary embodiment.

A swollen portion 504A, which has a shape substantially identical to that of the swollen portion 404A described in the preceding exemplary embodiment, and a mirror orientation adjustment lever 504B are adhered and fixed to the underside of the reflective surface of the reflective mirror 424. As shown in FIG. 12, the swollen portion 504A and the mirror orientation adjustment lever 504B are configured separately.

The swollen portion 504A, which has a shape substantially identical to that of the swollen portion 404A described in the preceding exemplary embodiment, includes a spherical surface 504A1, and an attachment surface 504A2 is adhered and fixed to the underside of the reflective surface of the reflective mirror 424 so that the center of the spherical surface of the spherical surface 504A1 substantially matches the intersection between the reflective surface of the reflective mirror 424 and the illumination optical axis A.

The mirror orientation adjustment lever 504B is configured by a member that has a substantial U shape when seen in plan view and is elastic. A base end portion of the mirror orientation adjustment lever 504B is adhered and fixed to an upper end portion of the underside of the reflective surface of the reflective mirror 424.

Additionally, when the reflective mirror 424 is to be disposed in a reflective mirror disposition portion 501F, the swollen portion 504A and the mirror orientation adjustment lever 504B are first adhered and fixed to the reflective mirror 424, the reflective mirror 424 in this state is housed inside the parts housing member 401 so that a distal end portion of the mirror orientation adjustment lever 504B is positioned at the outer side of the parts housing member 401 from above the reflective mirror disposition portion 501F, and the spherical surface 504A1 of the swollen portion 504A is brought into contact with the spherical concave portion 401M of the reflective mirror disposition portion 501F. At this time, an abutment portion 504B1 of the distal end portion of the mirror orientation adjustment lever 504B substantially planarly matches the center of the spherical surface of the swollen portion 504A, and the reflective mirror 424 is supported in a state where it is urged towards the reflective mirror disposition portion 501F by the mirror orientation adjustment lever 504B.

In this state, similar to the preceding exemplary embodiment, the orientation of the reflective mirror 424 is adjusted by grabbing the protruding site at the top of the mirror orientation adjustment lever 504B with one's hand. Then, similar to the preceding exemplary embodiment, an adhesive is instantly injected in the concave portion 401K after adjusting the orientation of the reflective mirror 424, and the reflective mirror 424 is fixed to the reflective mirror disposition portion 501F.

With this configuration, the standing ribs 401H and the urging members 405 can be omitted in comparison to the preceding exemplary embodiment, the manufacturing cost of the optical unit 4 can be reduced, and the reflective mirror 424 can be more easily disposed in the reflective mirror disposition portion 501F.

In the preceding exemplary embodiment, the mirror orientation adjustment lever 404B was formed a step lower with respect to the attachment surface 404A2 of the swollen portion 404A, but the invention is not limited thereto. The mirror orientation adjustment lever 404B may also be formed so that it is substantially even with the attachment surface 404A2 of the swollen portion 404A.

In the preceding exemplary embodiment, the shape of the groove portions 401J is not limited to the shape described in the preceding exemplary embodiment. Any shape may be adopted as long as it is a shape along which the reflective mirror 424 can be slid and inserted.

In the preceding exemplary embodiment, silicon rubber was used for the urging members 405, but the invention is not limited thereto. Other elastic members may be used, or plate springs may be used.

In the preceding exemplary embodiment, the reflective mirrors 421, 432 and 434 other than the reflective mirror 424 may have, similar to the reflective mirror 424, a configuration where they are retained in the optical parts-use casing 40 so that their orientations are adjustable.

In the preceding exemplary embodiment, a projector 1 using three liquid crystal panels 441R, 441G and 441B was described, but the invention is not limited thereto. For example, the invention may also be applicable to a projector using only one liquid crystal panel, a projector using two liquid crystal panels, or a projector using four or more liquid crystal panels.

In the preceding exemplary embodiment, the optical parts-use casing 40 had a substantial L shape when seen in plan view, but other shapes may be used. For example, the optical parts-use casing 40 may also have a substantial U shape when seen in plan view.

In the preceding exemplary embodiment, a transmissive type light modulation device was used whose light incident surface and light emission surface were different, but a reflective type light modulation device may be used whose light incident surface and light emission surface are the same.

In the preceding exemplary embodiment, only an example of a front type projector that conducts projection from the direction in which the screen is viewed was described, but the invention is also applicable to a rear type projector that conducts projection from the side opposite to the direction in which the screen is viewed.

In the preceding exemplary embodiment, a configuration was described where the retention structure of the reflective mirror 424 was used in the projector 1, but the invention is not limited thereto. The reflective mirror retention structure may also be used in another optical apparatus.

Exemplary configurations for implementing the invention have been disclosed in the above description, but the invention is not limited to this. Specifically, the invention has been illustrated and described mainly in regard to a specific exemplary embodiment, but persons skilled in the art can make various modifications to the preceding exemplary embodiments with respect to shapes, materials, numerical quantities and other details without deviating from the scope of the invention.

Thus, description limiting the shapes and materials disclosed above has been given as an illustration to facilitate understanding of the invention and is not intended to limit the invention. Thus, description by name of members from which part or all of limitations of these shapes and materials have been removed are included in the present invention.

INDUSTRIAL APPLICABILITY

With the optical device of the exemplary aspects of the present invention, the number of parts and the manufacturing cost can be reduced, and the disposition and adjustment of the orientation of the reflective mirror can be easily done. Thus, the optical device of the exemplary aspects of the present invention is useful as an optical device in a projector used in home theaters and presentations. Moreover, the optical device of the present invention does not require special devices or tools to adjust the optical axis when the optical device is manufactured, which is effective to reduce the manufacturing cost.

What is claimed is:

1. An optical device, having a plurality of optical parts comprising:
    a light source that emits light beams;
    a reflective mirror disposed on an optical path of the light beams emitted from the light source;
    an optical parts-use casing where an illumination optical axis of the light beams is set inside and which houses and retains the plural optical parts at a predetermined position with respect to the illumination optical axis;
    a swollen portion that is attached to an underside of a reflective surface of the reflective mirror, swells in an outward direction of the reflective mirror and is configured as part of a spherical surface; and
    a mirror orientation adjustment lever that is attached to the underside of the reflective surface of the reflective mirror, extends along the underside of the reflective mirror and planarly protrudes from an end edge of the reflective mirror,
    the reflective mirror being disposed along a side wall of the optical parts-use casing, and
    the side wall including, at a position where the reflective mirror is disposed, a concavely curved surface corresponding to the spherical surface of the swollen portion, and when the reflective mirror is disposed at the disposition position, the concavely curved surface supports the swollen portion.

2. The optical device of claim 1, the swollen portion and the mirror orientation adjustment lever being an integrally molded product.

3. The optical device of claim 2, the mirror orientation adjustment lever being formed a step lower with respect to an attachment surface of the swollen portion that attaches to the underside of the reflective mirror.

4. The optical device of claim 1, the swollen portion being attached to the underside of the reflective surface of the reflective mirror so that the center of the spherical surface of the swollen portion substantially matches an intersection between the illumination optical axis and the reflective surface of the reflective mirror.

5. The optical device of claim 1, groove portions into which the reflective mirror is insertable being formed in the side wall along a planar direction of the reflective mirror.

6. The optical device of claim 5, further comprising:
    urging members that are intervened between inner side surfaces of the groove portions and the reflective surface of the reflective mirror, and which urge the reflective mirror towards the side wall.

7. The optical device of claim 1, a concave portion that is recessed outward being formed in the side wall in correspondence to a position where the mirror orientation adjustment lever is disposed.

8. The optical device of claim 1,
    the optical parts-use casing being configured by a vessel-like parts housing member that houses the plural optical parts and a cover member that closes off an open portion of the parts housing member, and
    an opening being formed in the cover member in correspondence to the position where the mirror orientation adjustment lever is disposed, and when the reflective mirror is disposed at the disposition position, a distal end of the mirror orientation adjustment lever protrudes via the opening in the cover member.

9. A projector, comprising:
    a light modulation device that forms an optical image by modulating, in accordance with image information, light beams emitted from a light source;
    a projection optical device that magnifies and projects the optical image formed by the light modulation device; and
    the optical device of claim 1.

10. The projector of claim 9, the swollen portion and the mirror orientation adjustment lever being an integrally molded product.

11. The projector of claim 10, the mirror orientation adjustment lever being formed a step lower with respect to an attachment surface of the swollen portion that attaches to the underside of the reflective mirror.

12. The projector of claim 9, the swollen portion being attached to the underside of the reflective surface of the reflective mirror so that the center of the spherical surface of the swollen portion substantially matches an intersection between the illumination optical axis and the reflective surface of the reflective mirror.

13. The projector of claim 9, groove portions into which the reflective mirror is insertable being formed in the side wall along a planar direction of the reflective mirror.

14. The projector of claim 13, further comprising:
    urging members that are intervened between inner side surfaces of the groove portions and the reflective surface of the reflective mirror, and which urge the reflective mirror towards the side wall.

15. The projector of claim 9, a concave portion that is recessed outward being formed in the side wall in correspondence to a position where the mirror orientation adjustment lever is disposed.

16. The projector of claim 9,
    the optical parts-use casing being configured by a vessel-like parts housing member that houses the plural optical parts and a cover member that closes off an open portion of the parts housing member, and
    an opening being formed in the cover member in correspondence to the position where the mirror orientation adjustment lever is disposed, and when the reflective mirror is disposed at the disposition position, a distal end of the mirror orientation adjustment lever protrudes via the opening in the cover member.

* * * * *